United States Patent Office 3,077,338
Patented Feb. 12, 1963

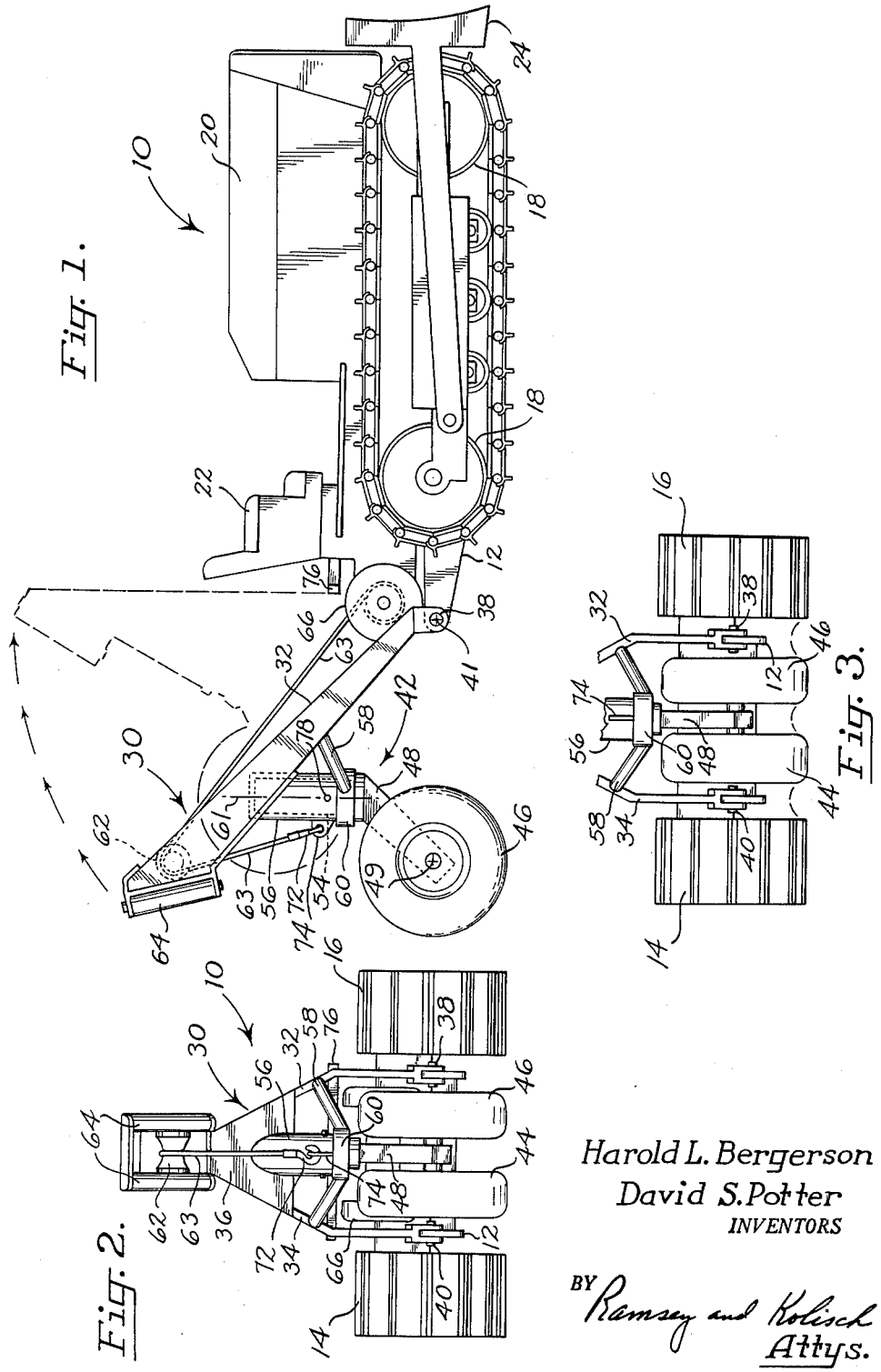

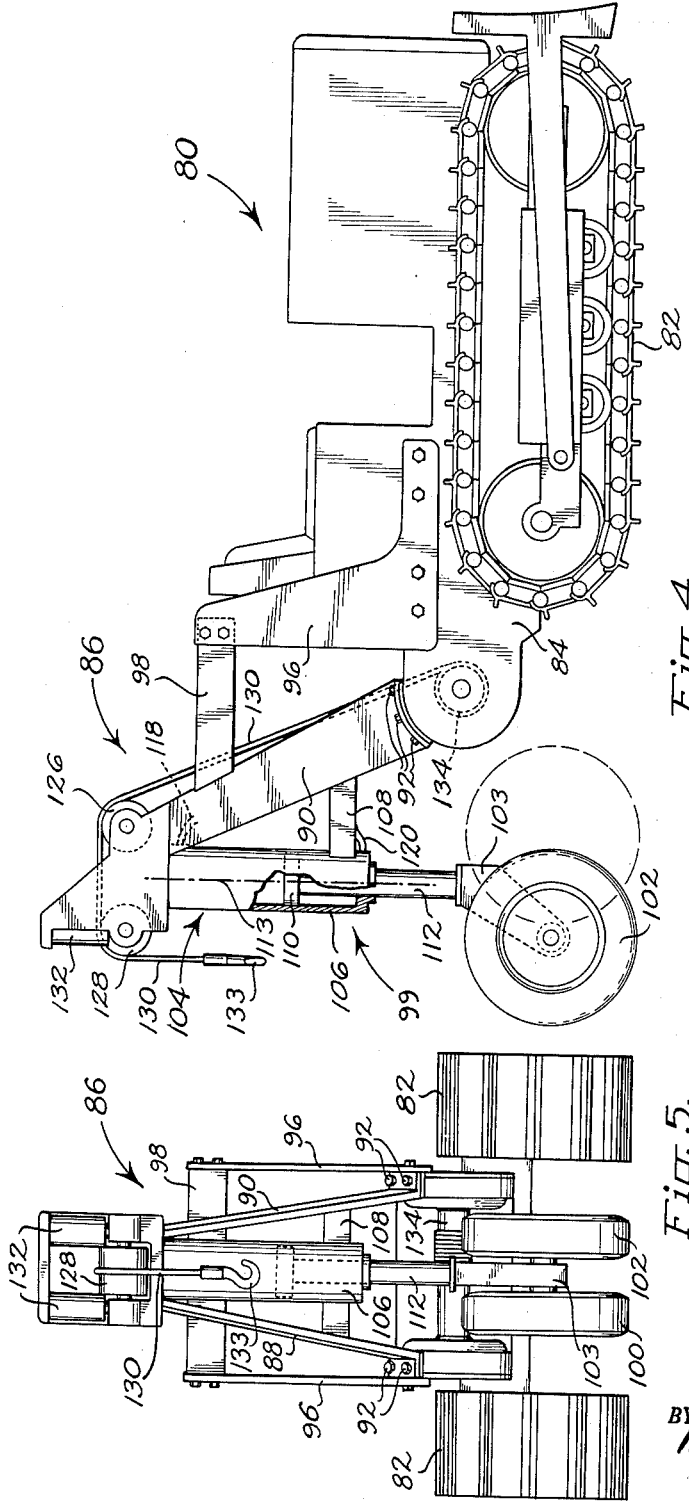

3,077,338
VEHICLE WITH BOOM
Harold L. Bergerson and David S. Potter, Vernonia, Oreg.; said Potter assignor to said Bergerson
Filed May 9, 1960, Ser. No. 27,777
11 Claims. (Cl. 254—139.1)

This invention relates to booms, and more particularly to a novel construction for a vehicle equipped with a boom which includes dolly wheel support means operable to support the downward thrust produced in the boom when a load is lifted thereby.

A vehicle equipped with the boom of this invention has particular utility in the log-hauling industry. It is common practice in so-called "ground logging" (where logs are moved by pulling them over the ground) to lift the forward end of a bundle of logs upon a logging arch, and then to pull the logs while dragging their trailing ends. The logging arch is disposed at the rear end of a tractor, and when the logs are lifted, their weight shifts to the rear of the tractor. The arch makes possible "short grouping," i.e., the trailing of logs closely adjacent the rear end of the tractor.

With known constructions, a number of difficulties have been encountered. With a heavy load, the weight supported by the rear end of the tractor tends to lift the tractor front end, and ground traction is impaired. A hazardous condition results, as it is relatively easy for a tractor so loaded to tip over backwards. Further, the concentration of weight on the tractor rear end tends to produce excessive rutting in a road, which increases road maintenance costs.

As contemplated by this invention, a tractor is provided at its rear end with an upwardly and rearwardly extending boom, more specifically a logging arch with legs diverging from an apex for the boom. The legs of the boom are connected adjacent their unjoined set of ends to the tractor frame. Mounted on the arch and extending downwardly therefrom is a support means having dolly wheel means at the base thereof operable to support the arch and the force exerted downwardly on the arch when the same is used to lift a load. The dolly wheel means is provided a swivelled mounting that enables it to follow the tractor in a turn. With the tractor traveling straight ahead, the dolly wheel means is located approximately at the longitudinal midline of the tractor and substantially directly under the apex of the boom. Preferably a pair of spaced wheels are used in the dolly wheel means, as these offer expansive ground-contacting surfaces for compacting the ground between the lateral supporting means of the tractor. The dolly wheel means follows the tractor on a turn by swinging entirely to the turn side of the tractor on a turn, and in this way is most effective to render proper support for the arch, such as will inhibit tipping of the tractor on a turn.

Thus, an object of the invention is to provide an improved construction for a boom that includes a support for the boom having dolly wheel means operable to take the downward thrust exerted on the boom when the boom is used to lift a load.

Another object is to provide an improved form of logging arch that includes dolly wheel means supporting the arch and a swivelled mounting for the dolly wheel means accommodating swinging of the wheel means as a unit to the turn side of the tractor when the tractor makes a turn.

Another object is to provide an improved boom for a tractor including a support for the boom having dolly wheel means, wherein means is provided accommodating relative movement of the dolly wheel means up and down with respect to the tractor frame, necessary for the wheel means properly to follow the ground.

A more specific object is to provide a novel construction for a boom and a support therefor wherein dolly wheel means is provided that is mounted on the rod portion of a vertically disposed ram extending downwardly from the boom, such ram through regulation of the actuating fluid supplied the ram enabling adjustments to be made in the amount of support rendered the boom by the dolly wheel means.

A still further object is to provide a novel construction for a boom wherein the boom is pivoted to the rear of a tractor, and the boom is provided with supporting means including swivelling dolly wheel means that may be lifted from the ground on upward pivotal movement of the boom.

Tractors equipped with booms as contemplated by this invention are ideally suited for logging operations where clearance is limited. Logs may be carried closely adjacent the rear end of a tractor, which facilitates making relatively sharp turns. Support is rendered the boom with the tractor traveling straight ahead or making a turn.

The following is a description of the invention, that is to be read in conjunction with the accompanying drawings, wherein:

FIG. 1 is a side view of a tractor having a logging arch as its rear end constructed according to one embodiment of the invention, such arch having a support including dolly wheel means and being pivoted to the rear end of the tractor;

FIG. 2 is a rear-end view of the tractor and logging arch illustrated in FIG. 1;

FIG. 3 is a drawing illustrating how the pair of spaced dolly wheels provided the boom support minimize high centers in a road;

FIG. 4 is a side view of a tractor and logging arch built according to another modification of the invention, the arch in this instance being fixed to the rear of the tractor and the support means supporting the arch including dolly wheel means and means accommodating vertical shifting of the dolly wheel means relative to the boom proper; and FIG. 5 is a rear-end view of the tractor and logging arch shown in FIG. 4.

Referring now to the drawings, and considering first the modification illustrated in FIGS. 1, 2, and 3, 10 indicates generally a crawler tractor having a tractor frame 12 and on either side of frame 12 crawler treads, indicated at 14 and 16. The crawler treads are suitably mounted on frame 12, as by wheels 18, at least one of which is power-driven whereby the treads may be moved. The treads constitute lateral support means supporting the tractor for movement over the ground. In some instances, a wheeled tractor might be employed, but in the logging industry, particularly in the northwest, crawler tractors predominate. Completing the general description of the tractor, 20 indicates a hood which covers the usual engine. A seat for the tractor operator is indicated at 22. As is conventional in logging operations, a bulldozer blade is mounted at the front end of the tractor, such being indicated at 24.

Mounted at the rear of the tractor, and extending upwardly and rearwardly from frame 12, is an arched boom, or logging arch 30. Arch 30 comprises a pair of opposed, diverging legs 32, 34, joined at their top set of ends by cross piece 36 so as to define an apex for the boom. The boom is connected to the tractor by pivot connections 38, 40 pivotally connecting the unjoined or lower ends of the legs to the tractor frame. The pivot connections restrict pivotal movement of the boom to movement about a boom pivot axis 41, that extends in a horizontal direction transversely of the tractor.

Arch or boom 30 has support means 42 depending downwardly therefrom. In the embodiment illustrated, support means 42 comprises a dolly wheel means taking the form of a pair of laterally spaced dolly wheels 44, 46. These are rotatably mounted on a swivelled mounting arm 48, for rotation about a horizontal wheel rotation axis 49 that extends transversely of the tractor. Arm 48 extends forwardly and upwardly from wheel rotation axis 49 and then joins with a vertically disposed journal portion 54. Journal portion 54 is rotatably mounted in a cylindrical bearing 56, which is fixed to the underside of the arch by arms 58 and annular collar 60. Journal portion 54 is fixed against axial shifting relative to cylindrical bearing 56 and on upward pivotal movement of the logging arch to the position shown in dashed lines in FIG. 1, the dolly wheels and arm 48 are lifted with the arch. In the construction, journal portion 54 and the cylindrical bearing constitute a swivel means, enabling swivelling of the dolly wheels and arm 48 about a vertical axis 61 located substantially at the midline of the tractor and forwardly of wheel rotation axis 49.

Mounted adjacent the apex of the logging arch for rotation about a horizontal axis extending transversely of the tractor is a sheave or pulley 62. Sheave 62 provides a low friction guide means for training a line such as line 63 over the apex of the arch. Adjacent the ends of the sheave are substantially upright fair-lead rollers 64.

A power-driven winch is provided for paying in and out line 63. This includes a winch drum 66 mounted on frame 12 of the tractor to the rear of seat 22. Line 63 has a grapple hook 72 on the end thereof used for securing the line about the end of a bundle of logs. When not used in log hauling, the hook may be fastened to the boom using eye 74. Note that the drum surface of the winch is on one side of a plane passing through the boom pivot axis 41 and sheave 62, and support means 42 for the boom is on the opposite side of such a plane. Thus, when hook 72 is inserted through eye 74 and line 63 then wound up on drum 66, after the line tightens, the boom will swing upwardly to the raised position indicated in dashed outline in FIG. 1. A stop 76 limits pivotal movement beyond the position shown in dashed outline. The boom may be kept raised when the tractor is used for purposes other than log hauling. For some purposes it may be desirable to lock the dolly wheels from swivel movement, as when the boom is raised, and for this purpose a removable pin 78 may be inserted through registering holes provided journal portion 54 and bearing 56.

Explaining the operation of the tractor and boom just described, during the hauling of logs the arch is lowered to the position shown in solid outline in FIG. 1, and pin 78 removed so that the dolly wheels and arm 48 can swing about axis 61. With the tractor traveling straight ahead, the dolly wheels are substantially directly under the apex of the boom or arch, thus most effectively to provide a support for a load. The end of a bundle of logs may be raised and positioned adjacent the apex of the arch by pulling in on cable or line 63 after the line has been secured about the logs. Pivot connections 38, 40 enable the boom to shift when necessary for wheels 44, 46 to follow the ground.

On a turn of the tractor, the boom or arch swings with the tractor, and the swivelled mounting for the dolly wheels enables the wheels to follow the tractor and in effect be shifted relative to the boom to the turn side of the tractor. Thus, on making a left turn, the wheels will position themselves on the left side of the longitudinal midline of the tractor. In this position the wheels are most effective in inhibiting tipping to one side of the tractor.

By using a pair of laterally spaced dolly wheels, instead of a single wheel, greater lateral stability results. Further, as can be seen with reference to FIG. 3, the ground between treads 14, 16 tends to be compacted more evenly, a decided advantage where ruts in a road are a problem.

Considering now the modification illustrated in FIGS. 4 and 5, in this embodiment a crawler tractor is indicated at 80, having treads 82 on either side of a tractor frame 84. A logging boom or arch is indicated at 86. The boom has legs 88, 90 joined together at their upper ends, and fastened to the tractor frame at their bottom set of ends by screws 92. Bracing the boom on the frame of the tractor are braces 96 and connecting members 98.

Support means for the boom is indicated at 99. The support means includes dolly wheels 100, 102 and an arm 103 mounting the wheels connected to the rod 112 of a ram 104. Ram 104 has a cylinder 106 extending substantially vertically downwardly from the apex of the arch. The cylinder is fixed to the arch, and braced by members 108. Within the cylinder is a piston 110 connected to rod 112.

The rod and piston are rotatable in cylinder 106 about a vertical axis 113 coinciding with the longitudinal axis of the cylinder. Thus, arm 103 mounting the wheels is a swivelled arm. Arm 103 places the dolly wheels substantially directly under the apex of the boom with the tractor traveling straight ahead. On a turn, the dolly wheels swing to the turn side of the tractor as in the first embodiment.

By including a ram in the mounting for the dolly wheels, vertical shifting of the wheels relative to the tractor frame may take place, enabling the wheels to follow uneven ground. Conduits 118, 120 are for the supply and exhaust of actuating fluid to the ram. These are shown broken off in the drawings for reasons of simplicity, but it should be understood that in actual practice they are connected to a suitable fluid supply regulated by appropriate valve mechanism. The pressure of actuating fluid within the ram is adjusted to vary the extent of the support rendered the boom by the dolly wheels. To lift the dolly wheels off the ground, actuating fluid is supplied the bottom of the ram to shift piston 110 upwardly in cylinder 106.

At the top of the logging arch are a pair of pulleys 126, 128 rotatable about horizontal axes extending transversely of the tractor. These are to support a line 130 trained thereover. By using a pair of pulleys, the line in supported at a location in front and to the rear of ram 104. A pair of fair-lead rollers adjacent the ends of the rearmost pulley 128 are indicated at 132. As in the first embodiment, a grapple hook 133 is secured to the end of line 130, used in attaching the line about the end of a bundle of logs. The line is wound on a power-driven winch drum 134.

It is claimed and desired to secure by Letters Patent:

1. The combination of a tractor having a frame and lateral support means on either side of the frame supporting the tractor for movement over the ground, an arched boom defined by a pair of opposed legs joined at one set of ends of define an apex for the boom, means mounting the boom adjacent the rear end of the tractor with the boom restricted against lateral movement thereof and with the legs of the boom connected to the tractor frame adjacent their unjoined set of ends and the boom extending upwardly and rearwardly of the tractor from its connection with the tractor frame, guide means adjacent the apex of the boom for guiding a line thereover, and support means for the boom mounted on and extending downwardly from the boom, said support means having ground-engaging dolly wheel means at the base thereof rotatable about a wheel rotation axis, and means mounting the dolly wheel means substantially directly under the apex of the boom with the tractor traveling straight ahead and accommodating swinging of the dolly wheel means to the turn side of the tractor upon the tractor making a turn, said means mounting the dolly wheel means comprising a swivelled arm that swivels about a substantially vertical axis located substantially at the longitudinal midline of the tractor and forwardly of the rotation axis for the dolly wheel means.

2. The combination of claim 1, wherein the legs of the boom are fixedly secured to the tractor adjacent their unjoined set of ends, and which further includes means yieldably accommodating vertical shifting of the dolly wheel means relative to the boom.

3. The combination of claim 1, wherein the legs of the boom are fixedly secured to the tractor adjacent their unjoined set of ends, and wherein the means mounting the dolly wheel means includes a vertical cylinder mounted on the boom, and a piston and rod mounted within the cylinder for vertical movement therein, said rod extending downwardly from the cylinder, said dolly wheel means being connected through said arm to adjacent the bottom end of said rod.

4. The combination of claim 3, wherein said guide means comprises a pair of pulleys rotatable about horizontal axes extending transversely of the tractor and spaced, one forwardly and the other rearwardly of said cylinder on said boom, and a pair of opposed fair-lead rollers mounted on the boom for rotation about upright axes and disposed, one adjacent one end and the other adjacent the other end of said other pulley that is spaced rearwardly of said cylinder.

5. The combination of a tractor having a frame and lateral support means on either side of the frame supporting the tractor for movement over the ground, an arched boom defined by a pair of opposed legs joined at one set of ends to define an apex for the boom, means mounting the boom adjacent the rear end of the tractor with the boom restricted against lateral movement thereof and with the legs of the boom connected to the tractor frame adjacent their unjoined set of ends and of the boom extending upwardly and rearwardly of the tractor from its connection with the tractor frame, guide means adjacent the apex of the boom for guiding a line thereover, and support means for the boom mounted on and extending downwardly from the boom, said support means comprising a pair of laterally spaced dolly wheels, a mounting arm, means mounting the wheels on said arm with the wheels rotatable about a wheel rotation axis, and means mounting the arm in a position wherein the dolly wheels are substantially directly under the apex of the boom with the tractor traveling straight ahead, the means mounting the arm including swivel means accommodating swinging of the arm about a vertical axis located substantially at the midline of the tractor and forwardly of the rotation axis of the dolly wheels, whereby the dolly wheels may shift to the turn side of the tractor on the tractor making a turn.

6. The combination of a tractor having a tractor frame and lateral support means on either side of the frame supporting the tractor for movement over the ground, an arched boom defined by a pair of opposed legs joined at one set of ends to define an apex for the boom, pivot means pivotally connecting the legs of the boom adjacent their unjoined set of ends to the rear end of the tractor frame and accommodating pivotal movement of the boom restricted substantially to movement about a horizontal axis extending transversely of the tractor, said boom extending upwardly and rearwardly from the rear end of said tractor, support means for the boom mounted on and extending downwardly from the boom and including ground-engaging dolly wheel means at the base thereof and a swivel mounting for the dolly wheel means, guide means adjacent the apex of the boom for guiding a line over the boom, and a winch mounted on the tractor frame in a position to pay in and out a line trained over said guide means.

7. The combination of claim 6, wherein said winch has a rotatable drum surface for collecting a line, and said drum surface is disposed on the opposite side of a plane passing through said boom pivot axis and said guide means from said support means for the boom.

8. The tractor and boom combination of claim 6 wherein said dolly wheel means comprises a pair of laterally spaced dolly wheels, and wherein the swivel mounting for the wheel means comprises an arm mounted on said support means for swivel movement about a vertical axis located substantially at the longitudinal midline of the tractor, said dolly wheels being rotatably mounted on said arm for rotation about a common wheel rotation axis disposed to the rear of said vertical axis, said dolly wheels being positioned by said arm substantially directly under the apex of the boom with the tractor traveling straight ahead.

9. The combination of a tractor having a tractor frame and lateral support means on either side of the frame supporting the tractor for movement over the ground, an arched boom defined by a pair of opposed legs joined at one set of ends to define an apex for the boom, pivot means pivotally connecting the legs of the boom adjacent their unjoined set of ends to the rear end of the tractor frame and accommodating pivotal movement of the boom restricted substantially to movement about a horizontal axis extending transversely of the tractor, guide means mounted adjacent the apex of the boom for guiding a line thereover, and support means mounted on and supporting the boom, said support means comprising ground-engaging dolly wheel means rotatable about a common wheel rotation axis, and a swivelled mounting for the dolly wheel means accommodating swinging of the wheel means about a vertical swivel axis located at substantially the midline of the tractor and in front of the wheel rotation axis, said mounting placing the dolly wheels substantially directly under the apex of the boom with the tractor traveling straight ahead and accommodating swinging of the dolly wheel means to the turn side of the tractor on turning of the tractor.

10. The tractor combination of claim 9 which further comprises a winch mounted on the tractor frame in position to pay in and pay out a line trained over said guide means.

11. The tractor combination of claim 9 wherein said dolly wheel means comprises a pair of laterally spaced dolly wheels mounted for rotation about a common wheel rotation axis, and which includes a swivelled mounting for the dolly wheels accommodating swivelling of the dolly wheel means about a vertical swivel axis spaced forwardly of the wheel rotation axis and at the longitudinal midline of the tractor.

References Cited in the file of this patent

UNITED STATES PATENTS

| 2,292,881 | Langdon | Aug. 11, 1942 |
| 2,627,983 | Lathers | Feb. 10, 1953 |